US007058421B2

(12) United States Patent
Ngai et al.

(10) Patent No.: US 7,058,421 B2
(45) Date of Patent: *Jun. 6, 2006

(54) WIRELESS TERMINAL OPERATING UNDER AN AGGREGATE TRANSMIT POWER LIMIT USING MULTIPLE MODEMS HAVING FIXED INDIVIDUAL TRANSMIT POWER LIMITS

(75) Inventors: Francis M. Ngai, Louisville, CO (US); Aziz Gholmieh, San Diego, CA (US); Doug Gerecht, Golden, CO (US); Jon J. Anderson, Boulder, CO (US); William R. Panton, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 467 days.

This patent is subject to a terminal disclaimer.

(21) Appl. No.: 10/283,676

(22) Filed: Oct. 29, 2002

(65) Prior Publication Data

US 2004/0082295 A1 Apr. 29, 2004

(51) Int. Cl.
*H04B 7/00* (2006.01)

(52) U.S. Cl. .................... 455/522; 455/13.4; 455/12.1; 455/69

(58) Field of Classification Search ............... 455/13.4, 455/12.1, 322, 69, 522, 67.11, 73; 375/222, 375/219, 296, 345

See application file for complete search history.

(56) References Cited

U.S. PATENT DOCUMENTS

| 6,157,619 A * | 12/2000 | Ozluturk et al. ............ 370/252 |
| 2002/0001292 A1* | 1/2002 | Miyamoto ................... 370/335 |
| 2002/0102983 A1* | 8/2002 | Furuskar et al. ............ 455/452 |
| 2003/0073435 A1* | 4/2003 | Thompson et al. ......... 455/428 |
| 2004/0047305 A1* | 3/2004 | Ulupinar ..................... 370/320 |
| 2004/0082308 A1* | 4/2004 | Ngai et al. .................. 455/322 |
| 2004/0198406 A1* | 10/2004 | Gholmieh et al. .......... 455/522 |

FOREIGN PATENT DOCUMENTS

| EP | 0887948 | 12/1998 |
| EP | 1071226 | 1/2001 |

* cited by examiner

*Primary Examiner*—Tilarun Gesesse
*Assistant Examiner*—Tan Trinh
(74) *Attorney, Agent, or Firm*—Philip R. Wadsworth; Gregory D. Ogrod

(57) ABSTRACT

A mobile wireless terminal (MWT) includes multiple wireless modems. The multiple modems have their respective transmit outputs combined to produce an aggregate transmit output. The multiple modems can concurrently transmit data in a reverse link direction and receive data in a forward link direction. The MWT is constrained to operate under an aggregate transmit power limit. Each of the multiple modems has an individual transmit limit related to the aggregate transmit power limit. When operating, over-limit ones of the multiple modems are deactivated and then reactivated to keep an aggregate transmit power of all of the modems below the aggregate limit, and to maximize data through-put on the forward and reverse links.

32 Claims, 11 Drawing Sheets

WIRELESS TERMINAL OPERATING UNDER AN AGGREGATE TRANSMIT POWER LIMIT USING MULTIPLE MODEMS HAVING FIXED INDIVIDUAL TRANSMIT POWER LIMITS

This application is related to commonly-owned applications, filed concurrently herewith, entitled "Controlling Multiple Modems In A Wireless Terminal Using Energy-Per-Bit Determinations" having application Ser. No. 10/283,935, filed Oct. 29, 2002, now allowed, and "Controlling Multiple Modems In A Wireless Terminal Using Dynamically Varying Modem Transmit Power Limits" having application Ser. No. 10/283,934, filed Oct. 29, 2002, now allowed, which are incorporated herein by reference.

BACKGROUND OF THE INVENTION

I. Field of the Invention

The present invention relates generally to mobile wireless terminals, and particularly, to mobile wireless terminals having multiple modems which are constrained to operate under an aggregate transmit power limit for all of the modems.

II. Related Art

In a data call established between a mobile wireless terminal (MWT) and a remote station, the MWT can transmit data to the remote station over a "reverse" communication link. Also, the MWT can receive data from the remote station over a "forward" communication link. There is an ever pressing need to increase the transmit and receive bandwidth, that is, the data rates, available over both the forward and reverse links.

Typically, the MWT includes a transmit power amplifier to power-amplify a radio frequency (RF) input signal. The power amplifier produces an amplified, RF output signal having an output power responsive to the input power of the input signal. An inordinately high input power may overdrive the power amplifier, and thus cause the output power to exceed an acceptable operating transmit power limit of the power amplifier. In turn, this may cause undesired distortion of the RF output signal, including unacceptable out-of-band RF emissions. Therefore, there is a need to carefully control the input and/or output power of the transmit power amplifier in an MWT so as to avoid overdriving the power amplifier. There is a related need to control the output power as just mentioned, while minimizing to the extent possible, any reduction of the forward and reverse link bandwidth (that is, data rates).

SUMMARY OF THE INVENTION

A feature of the present invention is to provide an MWT that maximizes an overall communication bandwidth in both the reverse and forward link directions using a plurality of concurrently operating communication links, each associated with a respective one of a plurality of modulator-demodulators (modems) of the MWT.

Another feature of the present invention is to provide an MWT that combines multiple modulator-demodulator (modem) transmit signals into an aggregate transmit signal (that is, an aggregate reverse link signal) so that a single transmit power amplifier can be used. This advantageously reduces power consumption, cost, and space requirements compared to known systems using multiple power amplifiers.

Another feature of the present invention is to carefully control an aggregate input and/or output power of the transmit power amplifier, thereby avoiding signal distortion at the power amplifier output. A related feature is to control the aggregate input and/or output power in such a manner as to maximize bandwidth (that is, data through-put) in both the reverse and forward link directions.

These features are achieved in several ways. First, individual transmit power limits are established in each of the plurality of modems of the MWT, to limit the respective, individual modem transmit powers. Each individual transmit power limit is derived, in part, from an aggregate transmit power limit for all of the modems. Together, the individual transmit power limits collectively limit the aggregate transmit power of all of the modems. The individual transmit limits are fixed over time, thereby reducing computational complexity while the MWT is operating. A active ones of the N modems are scheduled to transmit respective payload data, thereby causing each active modem to transmit the respective payload data.

Second, the present invention detects and deactivates "over-limit" ones (that is, individual members) of the multiple modems. An over-limit modem is one that has an actual transmit power, or a required transmit power, that exceeds the transmit power limit in the modem. In one arrangement of the present invention, the over-limit modems are deactivated in the reverse link direction only, and thus continue to receive data in the forward link direction. The deactivated modems are then reactivated when appropriate to reduce the overall adverse impact to reverse link through-put that may be caused by their initial deactivation.

The present invention is directed to an MWT including a plurality (N) of wireless modems. The N modems have their respective transmit outputs combined to produce an aggregate transmit output. The N modems can concurrently transmit data in the reverse link direction and receive data in the forward link direction. The MWT is constrained to operate within an aggregate transmit power limit. One aspect of the present invention is an apparatus, including: means for establishing in each of the N modems a respective transmit power limit; means for scheduling active ones of the N modems to transmit respective payload data, thereby causing each active modem to transmit the respective payload data; and means for deactivating at least one over-limit active modem, thereby causing the at least one over limit modem to cease transmitting payload data and correspondingly reduce a transmit power thereof. Another aspect of the present invention is a method corresponding to the above-mentioned apparatus. These and further aspects of the present invention are described below.

BRIEF DESCRIPTION OF THE DRAWINGS

The features, objects, and advantages of the present invention will become more apparent from the detailed description set forth below when taken in conjunction with the drawings in which like reference characters identify the same or similar elements throughout and wherein:

FIG. 11 also represents an example transmit scenario of the mobile wireless terminal of FIG. 2.

DETAILED DESCRIPTION OF EMBODIMENTS OF THE INVENTION

A variety of multiple access communication systems and techniques have been developed for transferring information among a large number of system users. However, spread spectrum modulation techniques, such as those used in code division multiple access (CDMA) communication systems provide significant advantages over other modulation schemes, especially when providing service for a large number of communication system users. Such techniques are disclosed in the teachings of U.S. Pat. No. 4,901,307, which issued Feb. 13, 1990 under the title "*Spread Spectrum Multiple Access Communication System Using Satellite Or Terrestrial Repeaters*," and U.S. Pat. No. 5,691,174, which issued Nov. 25, 1997, entitled "*Method and Apparatus for Using Full Spectrum Transmitted Power in a Spread Spectrum Communication System for Tracking Individual Recipient Phase Time and Energy*," both of which are assigned to the assignee of the present invention, and are incorporated herein by reference in their entirety.

The method for providing CDMA mobile communications was standardized in the United States by the Telecommunications Industry Association in TIA/EIA/IS-95-A entitled "*Mobile Station-Base Station Compatibility Standard for Dual-Mode Wideband Spread Spectrum Cellular System*," referred to herein as IS-95. Other communications systems are described in other standards such as the IMT-2000/UM, or International Mobile Telecommunications System 2000/Universal Mobile Telecommunications System, standards covering what are referred to as wideband CDMA (WCDMA), cdma2000 (such as cdma2000 1× or 3× standards, for example) or TD-SCDMA.

I. Example Communication Environment

Figure 1:
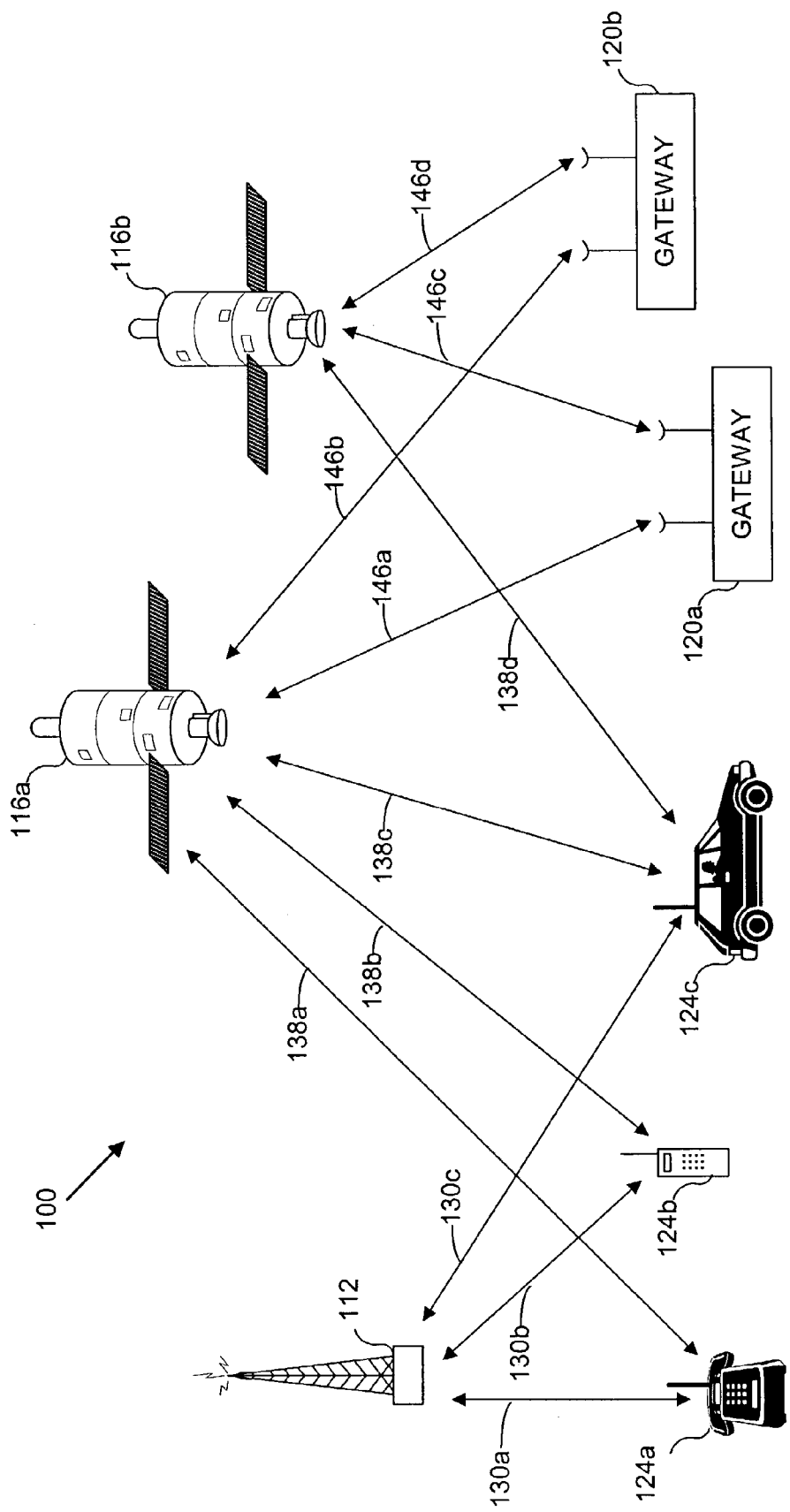
FIG. 1 is an illustration of an example wireless communication system.

FIG. 1 is an illustration of an exemplary wireless communication system (WCS) 100 that includes a base station 112, two satellites 116*a* and 116*b*, and two associated gateways (also referred to herein as hubs) 120*a* and 120*b*. These elements engage in wireless communications with user terminals 124*a*, 124*b*, and 124*c*. Typically, base stations and satellites/gateways are components of distinct terrestrial and satellite based communication systems. However, these distinct systems may inter-operate as an overall communications infrastructure.

Although FIG. 1 illustrates a single base station 112, two satellites 116, and two gateways 120, any number of these elements may be employed to achieve a desired communications capacity and geographic scope. For example, an exemplary implementation of WCS 100 includes 48 or more satellites, traveling in eight different orbital planes in Low Earth Orbit (LEO) to service a large number of user terminals 124.

The terms base station and gateway are also sometimes used interchangeably, each being a fixed central communication station, with gateways, such as gateways 120, being perceived in the art as highly specialized base stations that direct communications through satellite repeaters while base stations (also sometimes referred to as cell-sites), such as base station 112, use terrestrial antennas to direct communications within surrounding geographical regions.

In this example, user terminals 124 each have or include apparatus or a wireless communication device such as, but not limited to, a cellular telephone, wireless handset, a data transceiver, or a paging or position determination receiver. Furthermore each of user terminals 124 can be hand-held, portable as in vehicle-mounted (including for example cars, trucks, boats, trains, and planes), or fixed, as desired. For example, FIG. 1 illustrates user terminal 124*a* as a fixed telephone or data transceiver, user terminal 124*b* as a hand-held device, and user terminal 124*c* as a portable vehicle-mounted device. Wireless communications devices are also sometimes referred to as mobile wireless terminals, wireless communication devices, subscriber units, mobile units, mobile stations, mobile radios, or simply "users," "mobiles," "terminals," or "subscribers" in some communication systems, depending on preference.

User terminals 124 engage in wireless communications with other elements in WCS 100 through CDMA communications systems. However, the present invention may be employed in systems that employ other communications techniques, such as time division multiple access (TDMA), and frequency division multiple access (FDMA) ), or other waveforms or techniques listed above (WCDMA, CDMA2000 . . . ).

Generally, beams from a beam source, such as base station 112 or satellites 116, cover different geographical areas in predefined patterns. Beams at different frequencies, also referred to as CDMA channels, frequency division multiplexed (FDM) channels, or 'sub-beams', can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

FIG. 1 illustrates several exemplary signal paths. For example, communication links 130*a*–*c* provide for the exchange of signals between base station 112 and user terminals 124. Similarly, communications links 138*a*–*d* provide for the exchange of signals between satellites 116 and user terminals 124. Communications between satellites 116 and gateways 120 are facilitated by communications links 146*a*–*d*.

User terminals 124 are capable of engaging in bi-directional communications with base station 112 and/or satellites 116. As such, communications links 130 and 138 each include a forward link and a reverse link. A forward link conveys information signals to user terminals 124. For terrestrial-based communications in WCS 100, a forward link conveys information signals from base station 112 to a user terminal 124 across a link 130. A satellite-based forward link in the context of WCS 100 conveys information from a gateway 120 to a satellite 116 over a link 146 and from the satellite 116 to a user terminal 124 over a link 138. Thus, terrestrial-based forward links typically involve a single wireless signal path between the user terminal and base station, while satellite-based forward links typically involve two or more wireless signal paths between the user terminal and a gateway through at least one satellite (ignoring multipath).

In the context of WCS 100, a reverse link conveys information signals from a user terminal 124 to either a base station 112 or a gateway 120. Similar to forward links in WCS 100, reverse links typically require a single wireless signal path for terrestrial-based communications and two wireless signal paths for satellite-based communications. WCS 100 may feature different communications offerings across these forward links, such as low data rate (LDR) and high data rate (HDR) services. An exemplary LDR service provides forward links having data rates from 3 kilobits per second (kbps) to 9.6 kbps, while an exemplary HDR service supports typical data rates as high as 604 kbps and higher.

As described above, WCS 100 performs wireless communications according to CDMA techniques. Thus, signals transmitted across the forward and reverse links of links 130, 138, and 146 convey signals that are encoded, spread, and channelized according to CDMA transmission standards. In addition, block interleaving can be employed over these forward and reverse links. These blocks are transmitted in frames having a predetermined duration, such as 20 milliseconds.

Base station 112, satellites 116, and gateways 120 may adjust the power of the signals that they transmit over the forward links of WCS 100. This power (referred to herein as forward link transmit power) may be varied according to user terminal 124 and according to time. This time varying feature may be employed on a frame-by-frame basis. Such power adjustments are performed to maintain forward link bit error rates (BER) within specific requirements, reduce interference, and conserve transmission power.

User terminals 124 may adjust the power of the signals that they transmit across the reverse links of WCS 100, under the control of gateways 120 or base stations 112. This power (referred to herein as reverse link transmit power) may be varied according to user terminal 124 and according to time. This time varying feature may be employed on a frame-by-frame basis. Such power adjustments are performed to maintain reverse link bit error rates (BER) within specific requirements, reduce interference, and conserve transmission power.

Examples of techniques for exercising power control in CDMA communication systems are found in U.S. Pat. No. 5,383,219, entitled "*Fast Forward Link Power Control In A Code Division Multiple Access System*," U.S. Pat. No. 5,396,516, entitled "*Method And System For The Dynamic Modification Of Control Parameters In A Transmitter Power Control System*," and U.S. Pat. No. 5,056,109, entitled "*Method and Apparatus For Controlling Transmission Power In A CDMA Cellular Mobile Telephone System*," which are incorporated herein by reference.

II. Mobile Wireless Terminal

Figure 2:
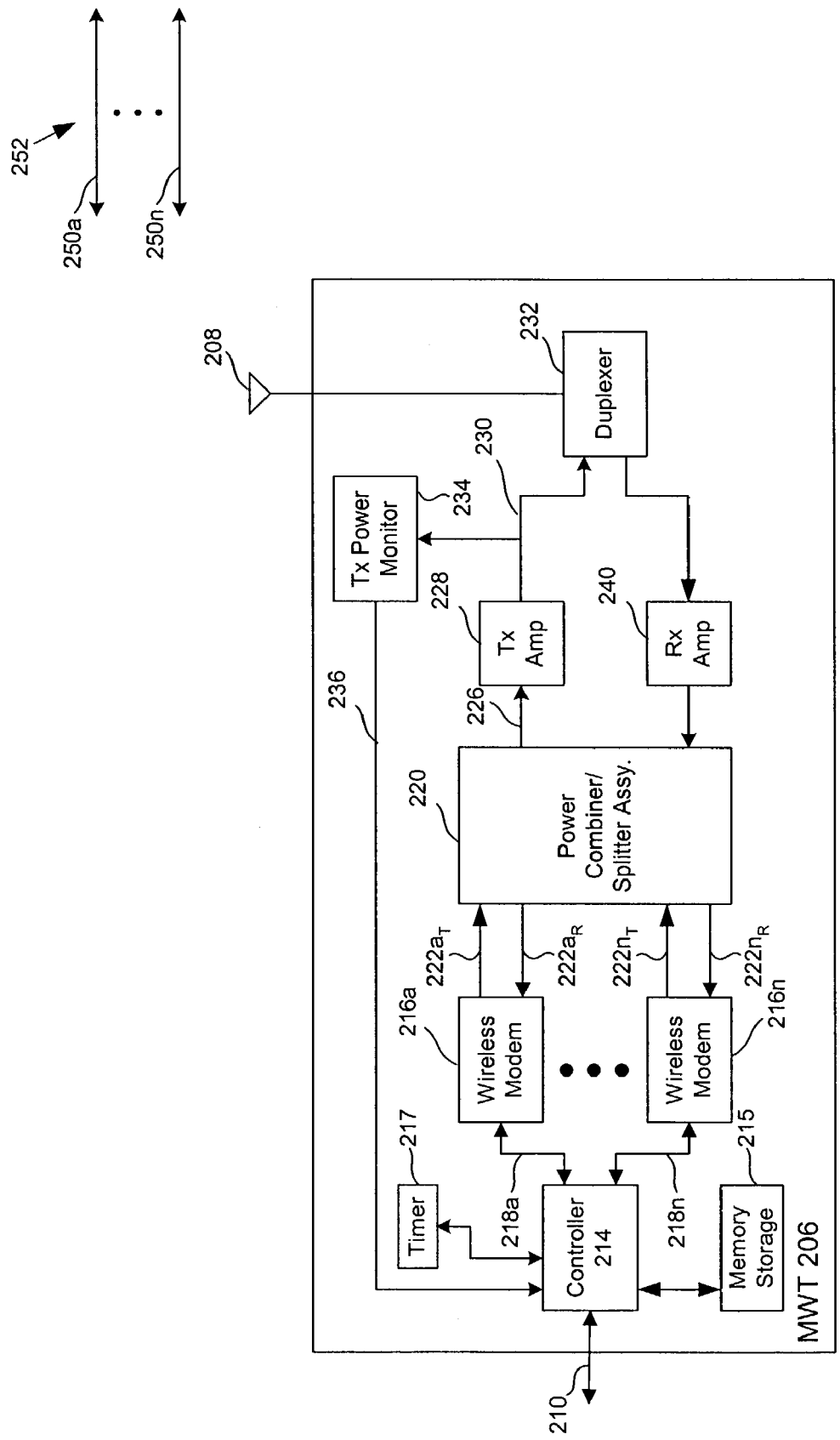
FIG. 2 is a block diagram of an example mobile wireless terminal.

FIG. 2 is a block diagram of an example MWT 206 constructed and operated in accordance with the principles of the present invention. MWT 206 communicates wirelessly with a base station or gateway (referred to as a remote station), not shown in FIG. 2. Also, MWT 206 may communicate with a user terminal. MWT 206 receives data from external data sources/sinks, such as a data network, data terminals, and the like, over a communication link 210, such as an ethernet link, for example. Also, MWT 206 sends data to the external data sources/sinks over communication link 210.

MWT 206 includes an antenna 208 for transmitting signals to and receiving signals from the remote station. MWT 206 includes a controller (that is, one or more controllers) 214 coupled to communication link 210. Controller 214 exchanges data with a memory/storage unit 215, and interfaces with a timer 217. Controller 214 provides data-to-be-transmitted to, and receives data from, a plurality of wireless modems 216*a*–216*n* over a plurality of corresponding bi-directional data links 218*a*–218*n* between controller 214 and modems 216. Data connections 218 may be serial data connections. The number N of modems that may be used can be one of several values as desired, based on known design issues such as complexity, cost, and so forth. In an example implementation, N=16.

Wireless modems 216*a*–216*n* provide RF signals $222a_T$–$222n_T$ to and receive RF signals $222a_R$–$222n_R$ from a power combiner/splitter assembly 220, over a plurality of bi-directional RF connections/cables between the modems and the power combiner/splitter assembly. In a transmit (that is, reverse link) direction, a power combiner included in assembly 220 combines together the RF signals received from all of modems 216, and provides a combined (that is, aggregate) RF transmit signal 226 to a transmit power amplifier 228. Transmit power amplifier 228 provides an amplified, aggregate RF transmit signal 230 to a duplexer 232.

Duplexer 232 provides the amplified, aggregate RF transmit signal to antenna 208. In MWT 206, duplexing may be achieved by means other than duplexer 232, such as using separate transmit and receive antennas. Also, a power monitor 234, coupled to an output of power amplifier 228, monitors a power level of amplified, aggregate transmit signal 230. Power monitor 234 provides a signal 236 indicating the power level of amplified, aggregate transmit signal 230 to controller 214. In an alternative arrangement of MWT 206, power monitor 234 measures the power level of aggregate signal 226 at the input to transmit amplifier 228. In this alternative arrangement, the aggregate transmit power limit of MWT 206 is specified at the input to transmit amplifier 228 instead of at its output, and the methods of the present invention, described below, take this into account.

In a receive (that is, forward link) direction, antenna 208 provides a received signal to duplexer 232. Duplexer 232 routes the received signal to a receive amplifier 240. Receive amplifier 240 provides an amplified received signal to assembly 220. A power splitter included in assembly 220 divides the amplified received signal into a plurality of separate received signals and provides each separate signal to a respective one of the modems 216.

MWT 206 communicates with the remote station over a plurality of wireless CDMA communication links 250*a*–250*n* established between MWT 206 and the remote station. Each of the communication links 250 is associated with a respective one of modems 216. Wireless communication links 250*a*–250*n* can operate concurrently with one another. Each of wireless communication links 250 supports wireless traffic channels for carrying data between MWT 206 and the remote station in both forward and reverse link directions. The plurality of wireless communication channels 250 form part of an air interface 252 between MWT 206 and the remote station.

In the present embodiment, MWT 206 is constrained to operate under an aggregate transmit power limit (APL) at the output of transmit amplifier 228. In other words, MWT 206 is required to limit the transmit power of signal 230 to a level that is preferably below the aggregate transmit power limit. All of modems 216, when transmitting, contribute to the aggregate transmit power of signal 230. Accordingly, the present invention includes techniques to control the transmit powers of modems 216, and thereby cause the aggregate transmit power of modems 216, as manifested in transmit signal 230, to be under the aggregate transmit power limit.

Over-driving transmit amplifier 228 causes the power level of signal 230 to exceed the aggregate transmit power limit. Therefore, the present invention establishes individual transmit power limits (also referred to as transmit limits) for each of modems 216. The individual transmit power limits are related to the aggregate transmit power limit in such a way as to prevent modems 216 from collectively over-driving transmit amplifier 228. During operation of MWT 206, the present invention detects and then deactivates over-limit ones of modems 216. In one arrangement, data calls associated with the over-limit modems are maintained, and the over-limit modems are deactivated in the reverse link direction only. Therefore, the over-limit modems advantageously remain active in the forward link direction, and are thus able to continue forward link communication, without causing transmit amplifier 228 to be over-driven. Further aspects of the present invention are described below.

Although MWT 206 is referred to as being mobile, it is to be understood that the MWT is not limited to a mobile platform or portable platforms. For example, MWT 206 may reside in a fixed base station or gateway. MWT 206 may also reside in a fixed user terminal 124a.

III. Modem

Figure 3:
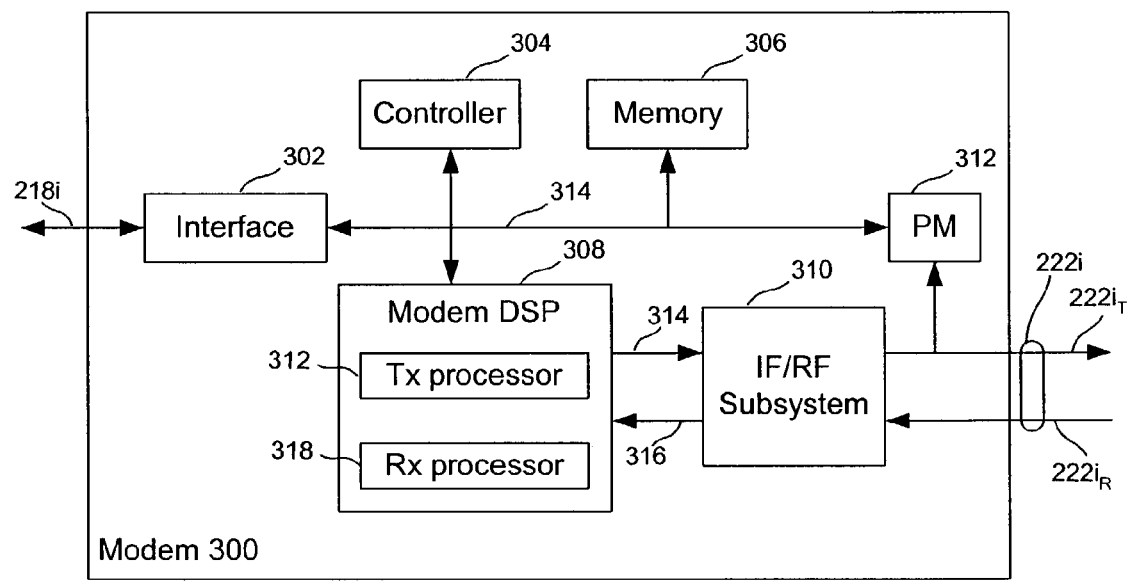
FIG. 3 is a block diagram of an example modem representative of individual modems of the mobile wireless terminal of FIG. 2.

FIG. 3 is a block diagram of an example modem 300 representative of each of modems 216. Modem 300 operates in accordance with CDMA principles. Modem 300 includes a data interface 302, a controller 304, a memory 306, a modem signal processor or module 308, such as one or more digital signal processors (DSPs) or ASICs, an intermediate frequency IF/RF subsystem 310, and an optional power monitor 312, all coupled to one another over a data bus 314. In some systems, the modems do not comprise transmit and receive processors coupled in pairs as in a more traditional modem structure, but may use an array of transmitters and receivers or modulators and demodulators which are interconnected, as desired, to handle user communications, and one or more signals, or otherwise time shared among users.

In the transmit direction, controller 304 receives data-to-be-transmitted from controller 214 over data connection 218i (where i indicates any one of the modems 216a–216n), and through interface 302. Controller 304 provides the data-to-be-transmitted to modem processor 308. A transmit (Tx) processor 312 of modem 308 encodes and modulates the data-to-be-transmitted, and packages the data into data frames that are to be transmitted. Transmit processor 312 provides a signal 314 including the data frames to IF/RF subsystem 310. Subsystem 310 frequency up-converts and amplifies signal 314, and provides a resulting frequency up-converted, amplified signal $222i_T$ to power combiner/splitter assembly 220. Optional power meter 312 monitors a power level of signal $222i_T$ (that is, the actual transmit power at which modem 300 transmits the above-mentioned data frames). Alternatively, modem 300 can determine the modem transmit power based on gain/attenuator settings of IF/RF subsystem 310 and the data rate at which modem 300 transmits the data frames.

In the receive direction, IF/RF subsystem 310 receives a received signal $222i_R$ from power combiner/splitter assembly 220, frequency down-converts signal $222i_R$ and provides the resulting frequency down-converted signal 316, including received data frames, to a receive (Rx) processor 318 of modem processor 308. Receive processor 318 extracts data from the data frames, and then controller 304 provides the extracted data to controller 214, using interface 302 and data connection 218i.

Figure 4:
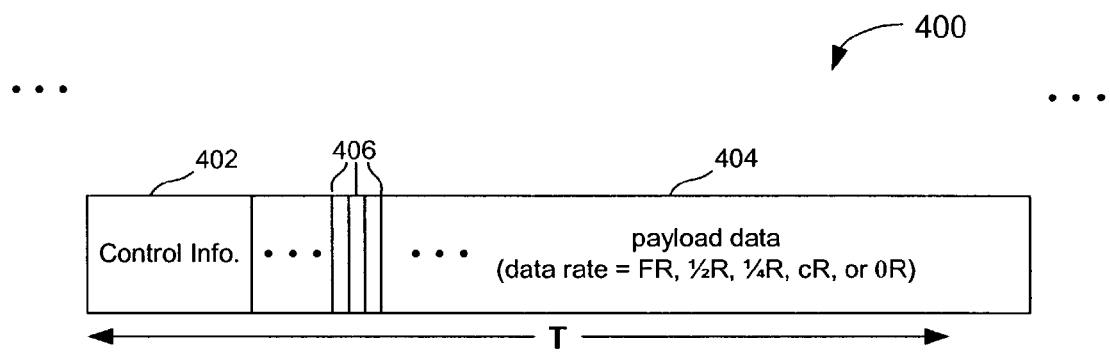
FIG. 4 is an illustration of an example data frame that may be transmitted or received by any one of the modems of FIGS. 2 and 3.

Modems 216 each transmit and receive data frames in the manner described above and further below. FIG. 4 is an illustration of an example data frame 400 that may be transmitted or received by any one of modems 216. Data frame 400 includes a control or overhead field 402 and a payload field 404. Fields 402 and 404 include bits used to transfer either control information (402) or payload data (404). Control field 402 includes control and header information used in managing a communication link established between a respective one of modems 216 and the remote station. Payload field 404 includes payload data (bits 406), for example, data-to-be-transmitted between controller 214 and the remote station during a data call (that is, over the communication link established between the modem and the remote station). For example, data received from controller 214, over data link 218i, is packaged into payload field 404.

Data frame 400 has a duration T, such as 20 milliseconds, for example. The payload data in payload field 404 is conveyed at one of a plurality of data rates, including a maximum or full-rate (for example, 9600 bits-per-second (bps)), a half-rate (for example, 4800 bps), a quarter-rate (for example, 2400 bps), or an eighth-rate (for example, 1200 bps). Each of the modems 216 attempts to transmit data at the full-rate (that is, at a maximum data rate). However, an over-limit modem rate-limits, whereby the modem reduces its transmit data rate from the maximum rate to a lower rate, as will be discussed below. Also, each of the modems 216 may transmit a data frame (for example, data frame 400) without payload data. This is referred to as a zero-rate data frame.

In one modem arrangement, each of the data bits 406 within a frame carries a constant amount of energy, regardless of the transmit data rate. That is, within a frame, the energy-per-bit, $E_b$, is constant for all of the different data rates. In this modem arrangement, each data frame corresponds to an instantaneous modem transmit power that is proportional to the data rate at which the data frame is transmitted. Therefore, the lower the data rate, the lower the modem transmit power.

Figure 5:
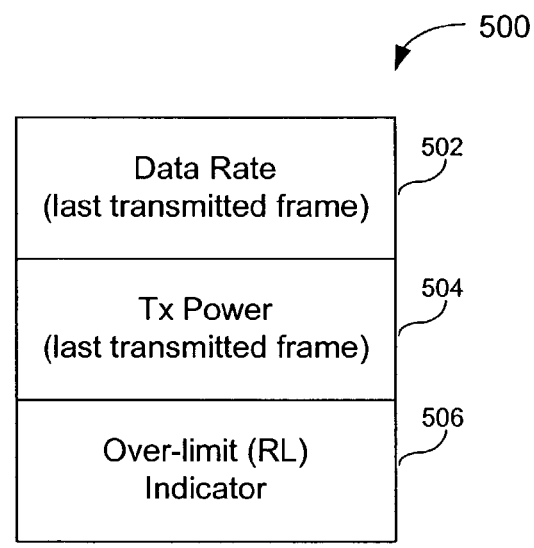
FIG. 5 is an illustration of an example status report from the modems of FIGS. 2 and 3.

Each of the modems 216 provides status reports to controller 214 over respective data connections 218. FIG. 5 is an illustration of an example status report 500. Status report 500 includes a modem data rate field 502, a modem transmit power field 504, and an optional over-limit (also referred to as a rate-limiting) indicator field 506. Each modem reports the data rate of the last transmitted data frame in field 502, and the transmit power of the last transmitted data frame in field 504. In addition, each modem can optionally report whether it is in a rate-limiting condition in field 506.

In another alternative modem arrangement, the modem can provide status signals indicating the over-limit/rate-limiting condition, the transmit power, and transmit data rate of the modem.

IV. Example Method

Figure 6:
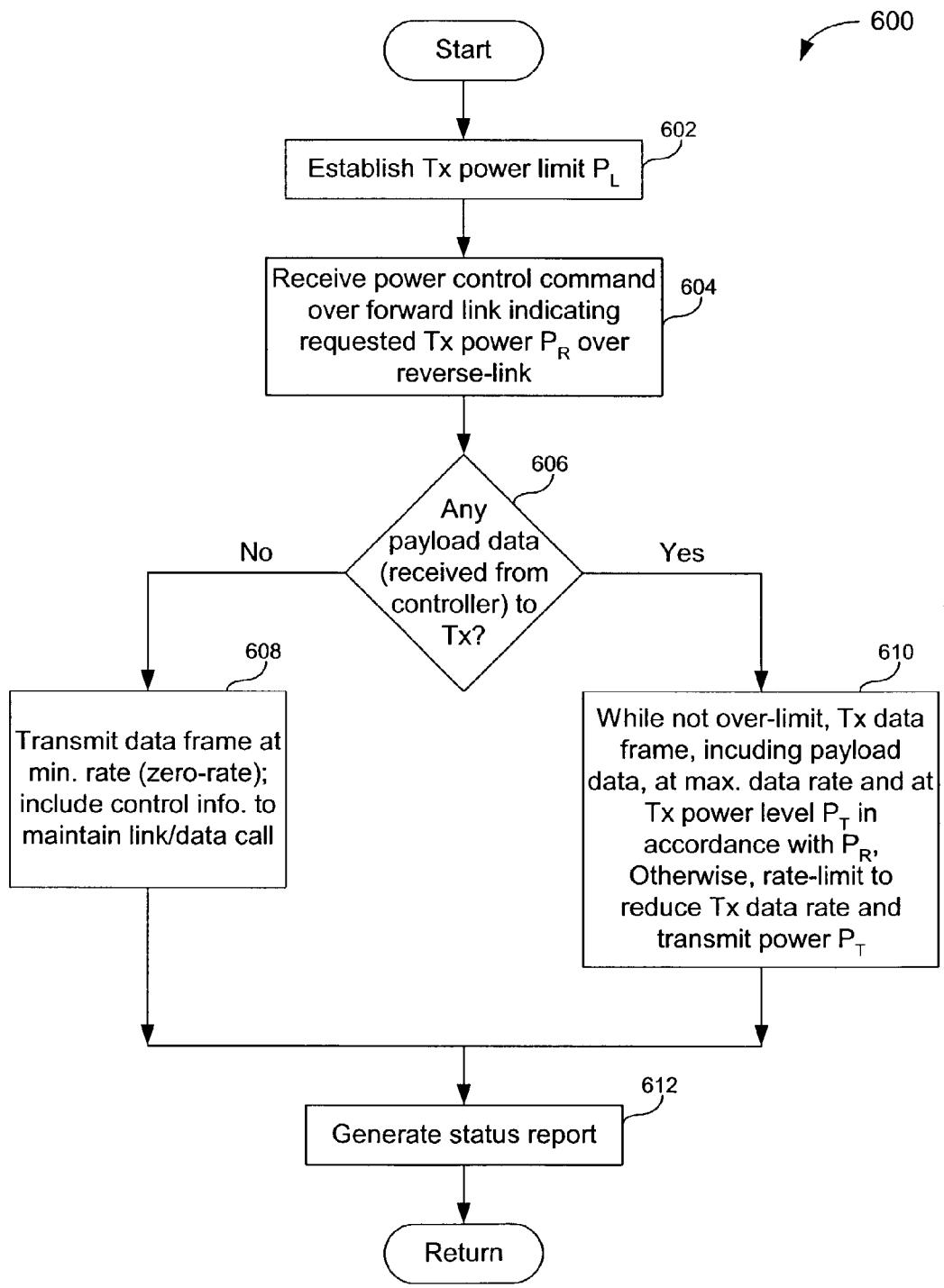
FIG. 6 is a flowchart of an example method performed by each of the modems of FIGS. 2 and 3.

FIG. 6 is a flowchart of an example method or process 600 representative of an operation of modem 300, and thus, of each of modems 216. Method 600 assumes a data call has been established between a modem (for example, modem 216a) and the remote station. That is, a communication link including a forward link and a reverse link has been established between the modem and the remote station.

At a first step 602, a transmit power limit $P_L$ is established in the modem (for example, in modem 216a).

At a next step 604, the modem receives a power control command from the remote station over the forward link indicating a requested transmit power $P_R$ at which the modem is to transmit data frames in the reverse link direction. This command may be in the form of an incremental power increase or decrease command.

At a decision step 606, the modem determines whether any payload data has been received from controller 214, that is, whether or not there is any payload data to transmit to the remote station. If not, the method proceeds to a next step 608. At step 608, the modem transmits a data frame at the zero-rate, that is, without payload data. The zero-rate data frame may include control/overhead information used to maintain the communication link/data call, for example. The zero-rate data frame corresponds to a minimum transmit power of the modem.

On the other hand, if there is payload data to transmit, then the processing of the method (control) proceeds from step 606 to a next step 610. At step 610, the modem determines whether or not it is not over-limit, that is, whether the modem is under-limit. In one arrangement, determining whether the modem is under-limit includes determining whether the requested transmit power $P_R$ is less than the transmit power limit $P_L$. In this arrangement, the modem is considered over-limit when the requested transmit power $P_R$ is greater than or equal to $P_L$. In an alternative arrangement, determining whether or not the modem is under-limit includes determining whether an actual transmit power $P_T$ of the modem is less than the transmit power limit $P_L$. In this arrangement, the modem is considered over-limit when $P_T$ is greater than or equal $P_L$. The modem may use power monitor 312 in determining whether its transmit power $P_T$, for example, the transmit power of signal $222i_T$, is less than the transmit power limit $P_L$.

While the modem is not-over limit, the modem transmits a data frame, including payload data and control information, at a maximum data rate (for example, the full-rate) and at a transmit power level $P_T$ that is in accordance with the requested transmit power $P_R$ and data rate of the data frame. In other words, the modem transmit power $P_T$ tracks the requested transmit power $P_R$.

When $P_T$ or $P_R$ is equal to or greater than $P_L$, the modem is over-limit, and thus rate-limits from a current rate (for example, the full-rate) to a lower transmit data rate (for example, to the half-rate, quarter-rate, eighth-rate or even the zero-rate), thereby reducing the transmit power $P_T$ of the modem relative to when the modem was transmitting at the full-rate. Therefore, rate-limiting in response to either of the over-limit conditions described above is a form of modem self power-limiting, whereby the modem maintains its transmit power $P_T$ below the transmit power limit $P_L$. Also, the over-limit/rate-limiting condition, as reported in status report 500, indicates to controller 214 that the requested power $P_R$, or the actual transmit power $P_T$ in the alternative arrangement, is greater than or equal to the transmit power limit $P_L$. It should be appreciated that while the modem may be operating at the zero-rate in the transmit (that is, reverse link) direction, because it either is rate-limiting (for example, in step 610) or has no payload data to transmit (step 608), it may still receive full-rate data frames in the receive (that is, forward link) direction.

Although it can be advantageous for the modem to self rate-limit in response to the over-limit condition, an alternative arrangement of the modem does not rate-limit in this manner. Instead, the modem reports the over-limit condition to controller 214, and then waits for the controller to impose rate-limiting adjustments. A preferred arrangement uses both approaches. That is, the modem self rate-limits in response to the over-limit condition, and the modem reports the over-limit condition to controller 214, and in response, the controller imposes rate-limiting adjustments on the modem.

After both step 608 and step 610, the modem generates a status report (for example, status report 500) at a step 612, and provides the report to controller 214 over a respective one of data links 218.

V. Fixed Transmit Power Limit Embodiments

Figure 7:
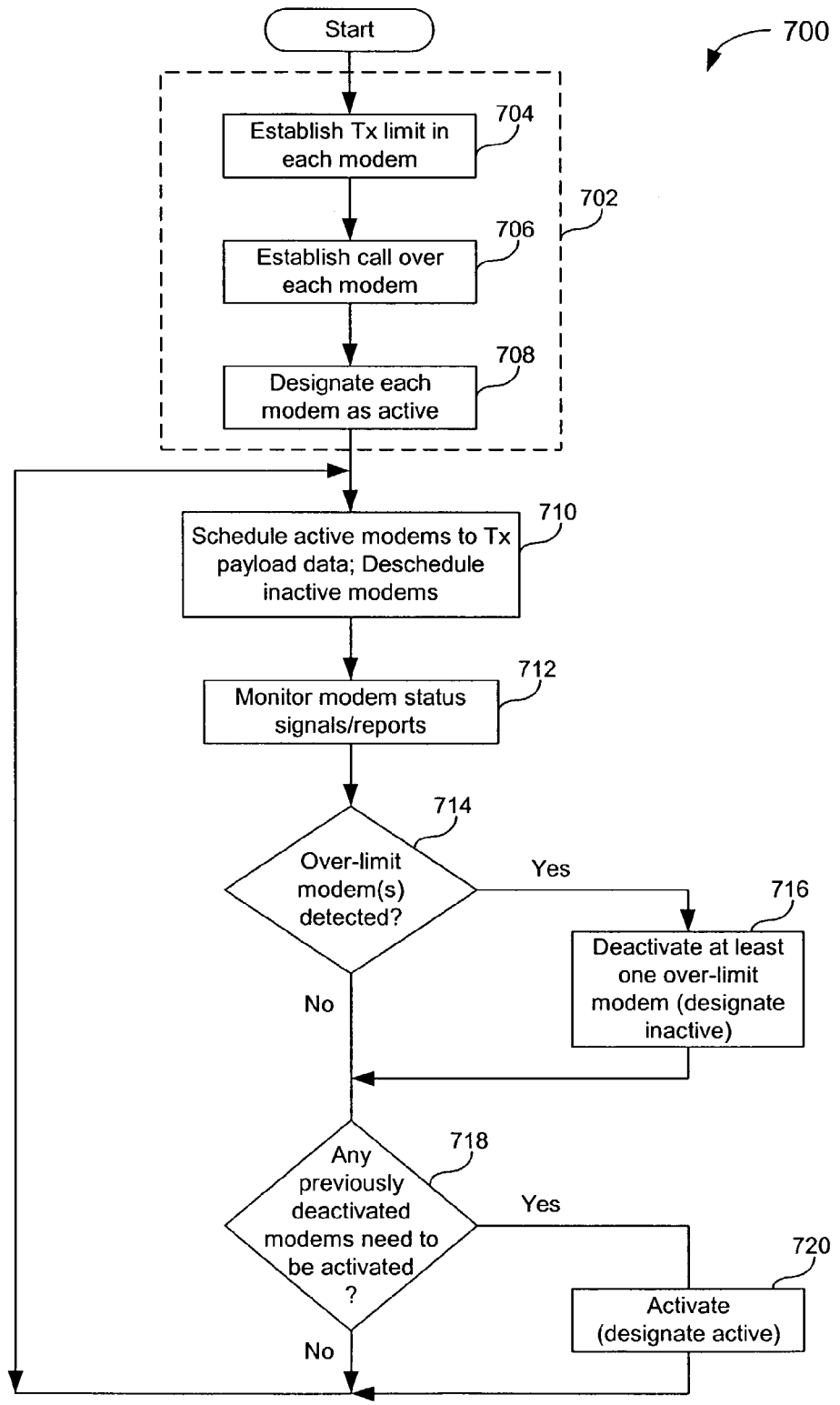
FIG. 7 is a flowchart of an example method performed by the mobile wireless terminal.

FIG. 7 is a flowchart of an example method performed by MWT 206, accordance with the present embodiments. Method 700 includes an initializing step 702. Step 702 includes further steps 704, 706, and 708. At step 704, controller 214 establishes an individual transmit power limit $P_L$ in each of modems 216. The transmit power limits are fixed over time in method 700.

At step 706, controller 214 establishes a data call over each of modems 216. In other words, a communication link, including both forward and reverse links, is established between each of the modems 216 and the remote station. The communication links operate concurrently with one another. In an exemplary arrangement of the present invention, the communication links are CDMA based communication links.

In the embodiments, a modem may be designated as an active modem or as an inactive modem. Controller 214 can schedule active modems, but not inactive modems, to transmit payload data. Controller 214 maintains a list identifying currently active modems. At a step 708, controller 214 initially designates all of the modems as being active, by adding each of the modems to the active list, for example.

At a next step 710, assuming controller 214 has received data that needs to be transmitted to the remote station, controller 214 schedules each of the active modems to transmit payload data. In a first past through step 710, all of modems 216 are active (from step 708). However, in subsequent passes through step 710, some of modems 216 may be inactive, as will be described below.

Controller 214 maintains a queue of data-to-be-transmitted for each of the active modems, and supplies each data queue with data received from the external data sources over link 210. Controller 214 provides data from each data queue to the respective active modem. Controller 214 executes data-loading algorithms to ensure the respective data queues are generally, relatively evenly loaded, so that each active modem is concurrently provided with data-to-be-transmitted. After controller 214 provides data to each modem, each modem in turn attempts to transmit the data in data frames at the full-rate and in accordance with the respective requested transmit power $P_R$, as described above in connection with FIG. 6.

At step 710, controller 214 also de-schedules inactive modems by diverting data-to-be-transmitted away from the inactive modems and toward the active modems. However, there are no inactive modems in the first pass through step 710, since all of the modems are initially active after step 708, as mentioned above.

At a next step 712, controller 214 monitors the modem status reports from all of the inactive and active modems.

At a next step 714, controller 214 determines whether any of the modems 216 are over-limit, and thus rate-limiting, based on the modem status reports. If controller 214 determines that one or more (that is, at least one) of the modems are over-limit, then controller 214 deactivates only these over-limit modems, at a step 716. For example, controller 214 can deactivate an over-limit modem by removing it from the active list.

If none of the modems are determined to be over-limit at step 714, the method or processing proceeds to a step 718. The method also proceeds to step 718 after any over-limit modems are deactivated in step 716. At step 718, controller 214 determines whether or not any of the modems previously deactivated at step 716 need to be activated (that is, reactivated). Several techniques for determining whether modems should be activated are discussed below. If the answer at step 718 is yes (modems need to be reactivated), then the method proceeds to a step 720, and controller 214 activates the previously deactivated modems that need to be activated, for example, by reinstating the modems on the active list.

If none of the previously deactivated modems need to be activated, then processing proceeds from step 718 back to step 710. Also, processing proceeds from step 720 to step 710. Steps 710 through 720 are repeated over time, whereby over-limit ones of modems 216 are deactivated at step 716 and then reactivated at step 718 as appropriate, and correspondingly de-scheduled and rescheduled at step 710.

When an over-limit modem is deactivated at step 716 (that is, becomes inactive), and remains deactivated through step 718, the modem will be de-scheduled in the next pass through step 710. In other words, controller 214 will no longer provide data to the deactivated modem. Instead, controller 214 will divert data to active modems. If it is assumed that the data call associated with the deactivated modem has not been torn-down (that is, terminated), then de-scheduling the modem at step 710 will cause the deactivated modem to have no payload data to transmit, and will thus cause the modem to operate at the zero-rate and at a corresponding minimum transmit power level on the reverse link (see steps 606 and 608, described above in connection with FIG. 6). This keeps the data call alive or active on the deactivated/de-scheduled modem, so the modem can still receive full-rate data frames on the forward link. When a data call associated with a modem is torn-down, that is, ended or terminated, the modem stops transmitting and receiving data altogether.

Deactivating the over-limit modem at step 716 ultimately causes the modem to reduce its transmit data rate and corresponding transmit power in the reverse link direction. In this manner, controller 214 individually controls the transmit power limits (and, thus, the transmit powers), and as a result, can maintain the aggregate transmit power of signal 230 at a level below the aggregate transmit power limit of MWT 206.

Alternative arrangements of method 700 are possible. As described above, deactivating step 716 includes deactivating an over-limit modem by designating the modem as inactive, for example, by removing the modem from the active list. Conversely, activating step 720 includes reinstating the deactivated modem to the active list. In an alternative arrangement of method 700, deactivating step 716 further includes tearing-down (that is terminating) the data call (that is, the communication link) associated with the over-limit modem. Also, in this alternative arrangement, activating step 720 further includes establishing another data call over the previously deactivated modem, so that the modem can begin to transmit data to and receive data from the remote station.

In another alternative arrangement of method 700, deactivating step 716 further includes deactivating all of the modems, whether over-limit or not over-limit, when any one of the over-limit modems is detected at step 714. In this arrangement, deactivating the modems may include designating all of the modems as inactive, and may further include tearing-down all of the data calls associated with the modems.

Figure 8:
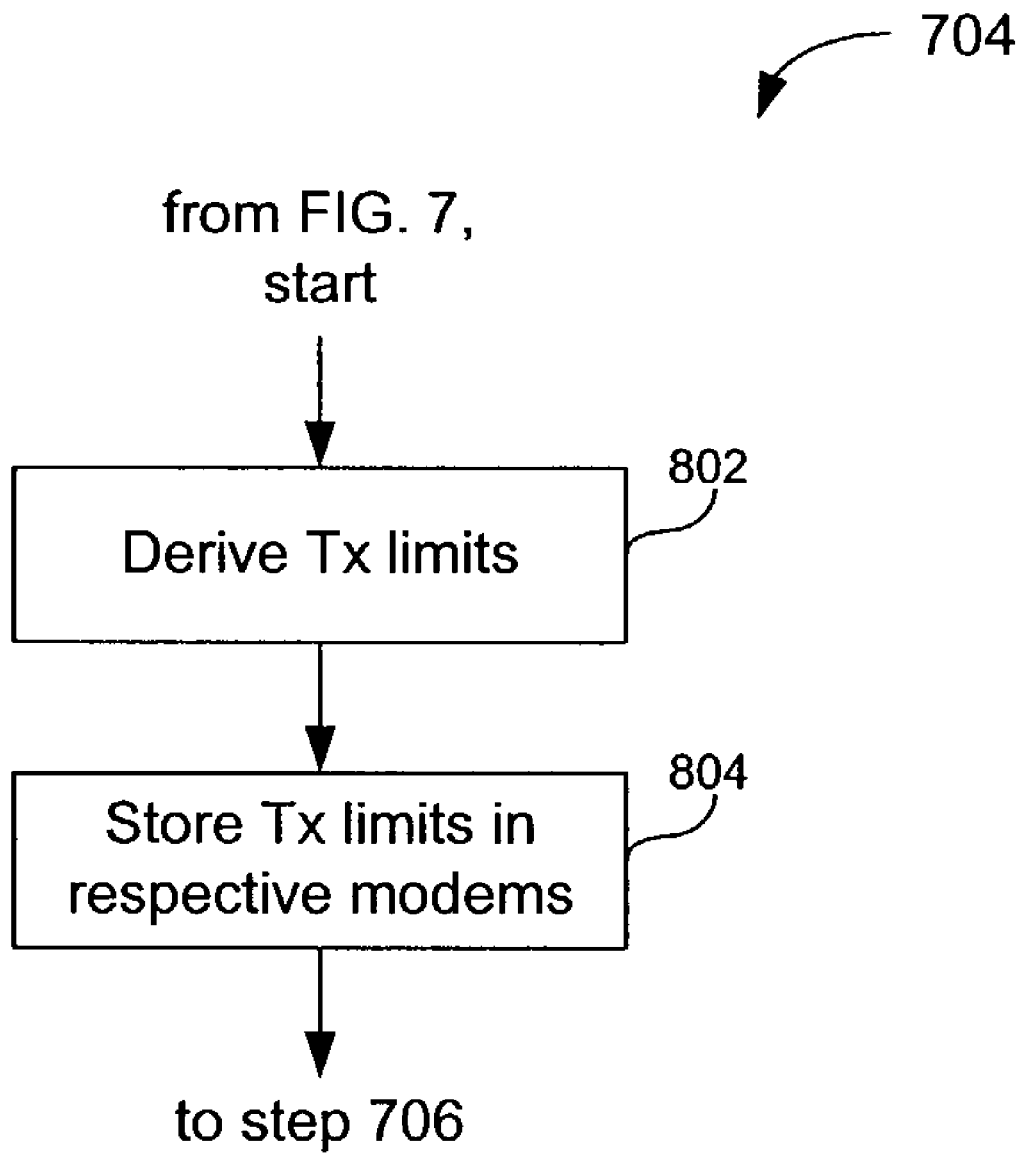
FIG. 8 is a flowchart expanding on the method of FIG. 7.

FIG. 8 is a flowchart expanding on transmit limit establishing step 704 of method 700. At a first step 802, controller 214 derives the transmit power limit for each of modems 216. For example, controller 214 may calculate the transmit power limits, or simply access predetermined limits stored in a memory look-up table. At a next step 804, controller 214 provides each of the modems 216 with a respective one of the transmit power limits, and in response, the modems store their respective transmit power limits in their respective memories.

Figure 9:
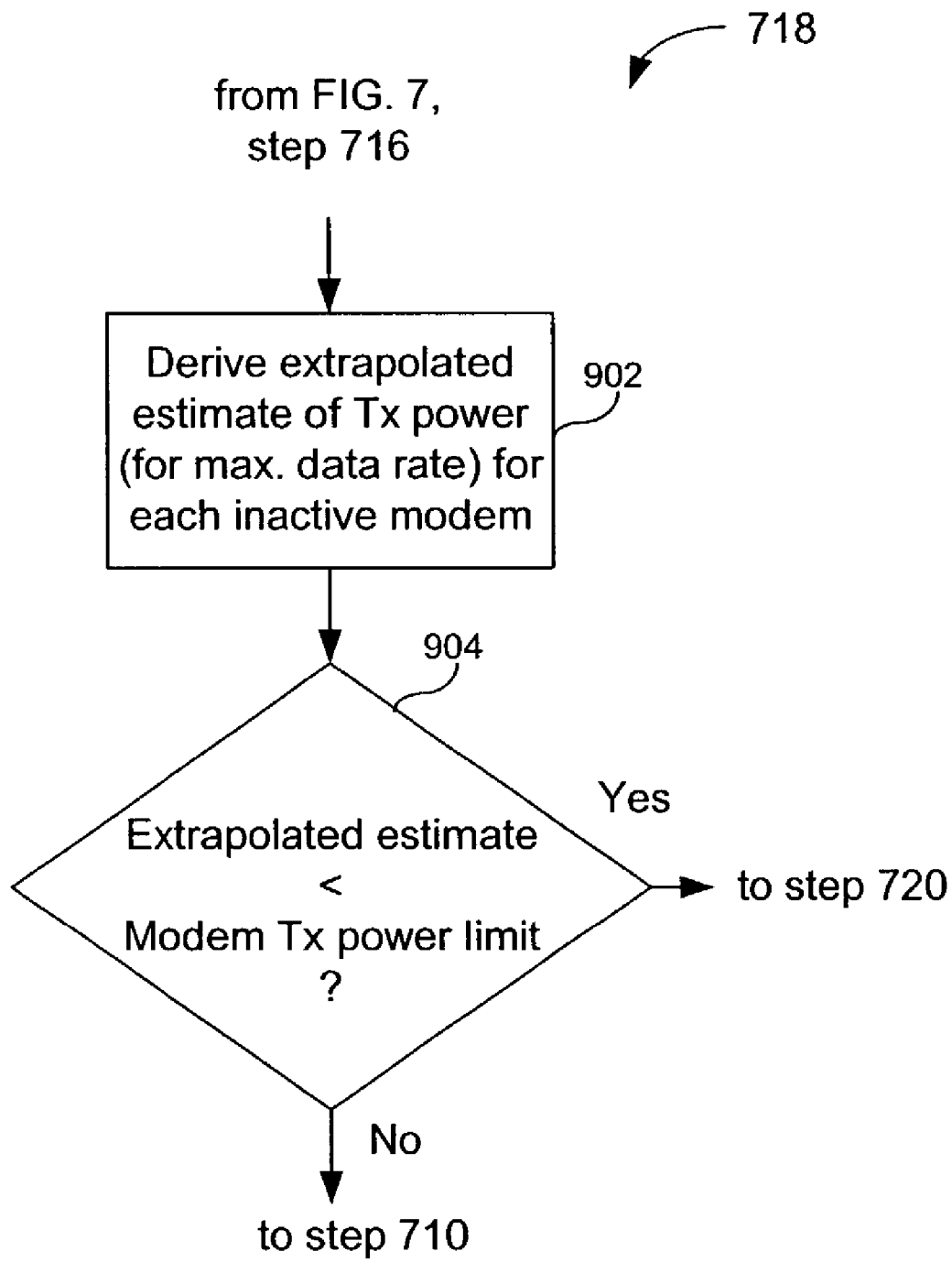
FIG. 9 is a flowchart expanding on the method of FIG. 7.

FIG. 9 is a flowchart expanding on determining step 718 of method 700. Controller 214 monitors (at step 712, for example) the respective reported transmit powers of the deactivated/inactive modems that are transmitting at the zero-rate. At a step 902, controller 214 derives, from the reported modem transmit powers, respective extrapolated modem transmit powers representative of when the modems transmit at the maximum transmit data rate.

At a next step 904, controller 214 determines whether each extrapolated transmit power is less than the respective modem transmit power limit $P_L$. If yes, then processing proceeds to step 720 where the respective modem is activated, because it is likely the modem will not exceed the power limit. If not, the modem remains deactivated, and the method shifts or proceeds back to step 710.

Figure 10:
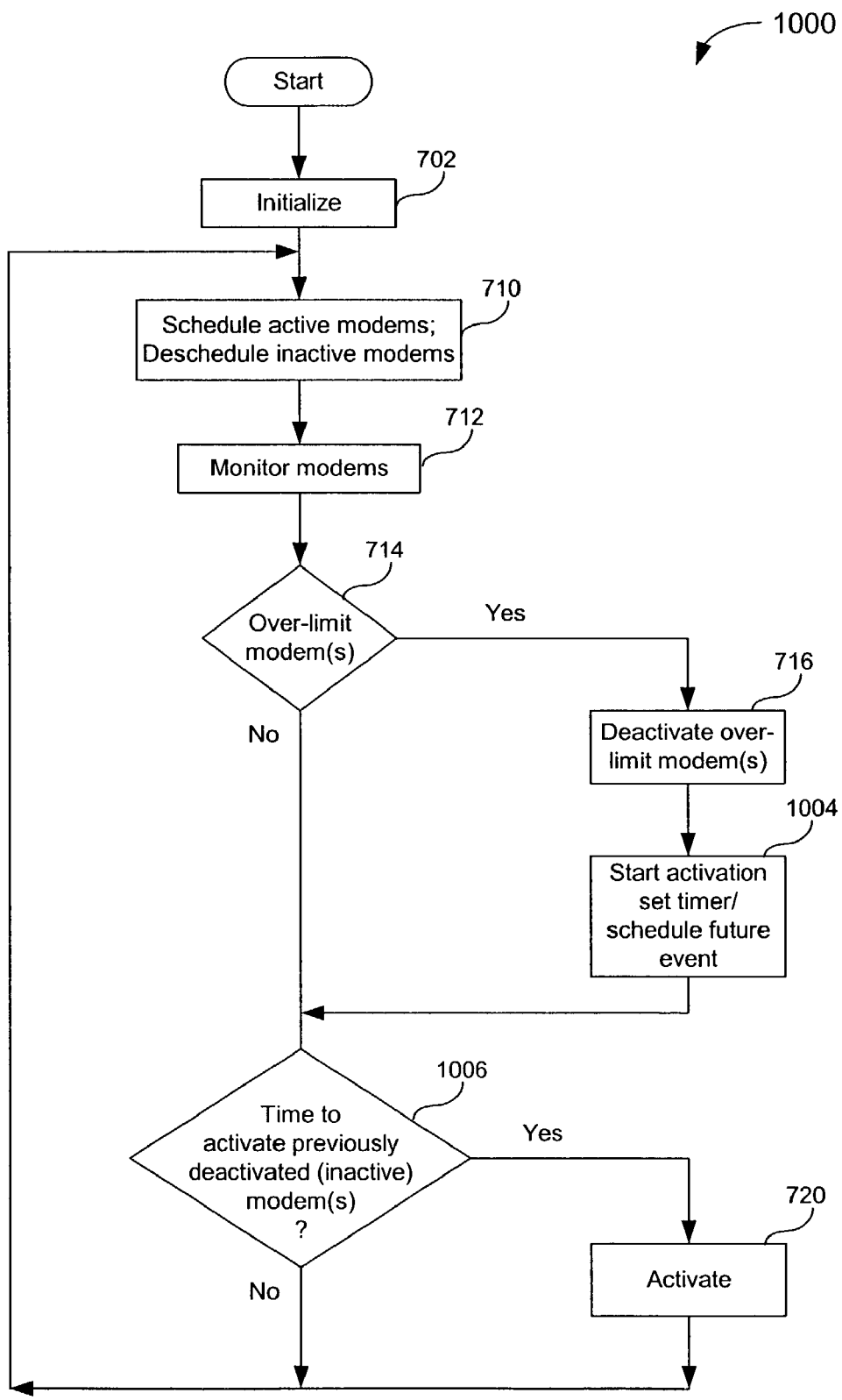
FIG. 10 is a flowchart of another example method performed by the mobile wireless terminal.

FIG. 10 is a flowchart of another example method 1000 performed by MWT 206. Method 1000 includes many of the method steps described previously in connection with FIG. 7, and such method steps will not be described again. However, method 1000 includes a new step 1004 following step 716, and a corresponding determining step 1006. At step 1004, controller 214 initiates an activation timeout period (for example, using timer 217) corresponding to each modem deactivated at step 716. Alternatively, controller 214 can schedule a future activation time/event corresponding to each modem deactivated in step 716.

At determining step 1006, controller 214 determines whether it is time to activate any of the previously deactivated modems. For example, controller 214 determines whether any of the activation timeout periods have expired, thereby indicating it is time to activate the corresponding deactivated modem. Alternatively, controller 214 determines whether the activation time/event scheduled at step 1004 has arrived.

Alternative arrangements of method 1000, similar to the alternative arrangements discussed above in connection with method 700, are also envisioned.

VI. Fixed Transmit Power Limits

1. Uniform Limits

Figure 11:
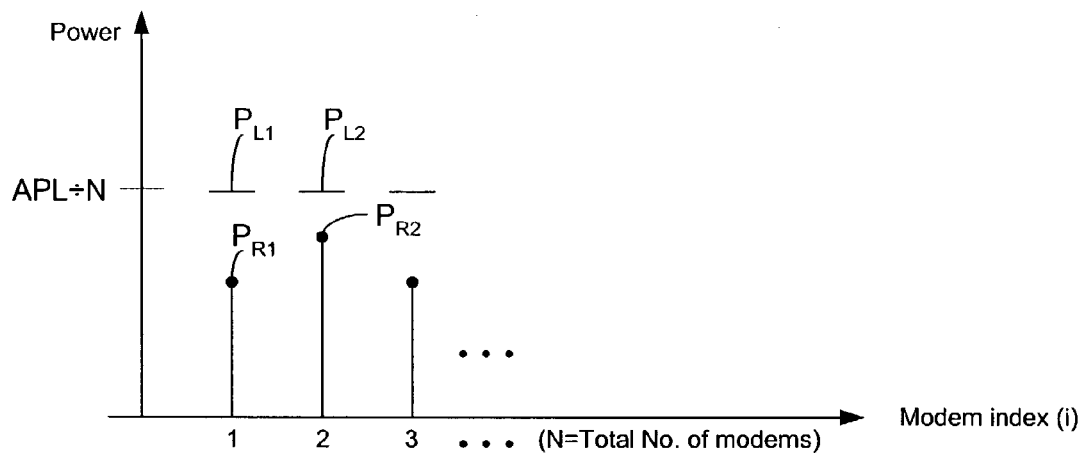
FIG. 11 is an example plot of Power versus Modem index(i) identifying respective ones of the modems of FIG. 2, wherein uniform modem transmit power limits are depicted.

In one fixed limit arrangement, a uniform set of transmit power limits is established across all of modems 216. That is, each modem has the same transmit power limit as each of the other modems. FIG. 11 is an example plot of Power versus Modem index(i) identifying respective ones of the modems 216, wherein uniform, modem transmit power limits $P_{Li}$ are depicted. As depicted in FIG. 11, modem(1) corresponds to power limit $P_{L1}$, modem(2) corresponds to power limit $P_{L2}$, and so on.

In one arrangement of uniform limits, each transmit power limit $P_L$ is equal to the aggregate transmit power limit APL divided by the total number N of modems 216. Under this arrangement of uniform limits, when all of the modems have respective transmit powers equal to their respective transmit power limits, the aggregate transmit power for all of the modems will just meet, and not exceed, the APL. An example aggregate transmit power limit APL in the present invention is approximately 10 or 11 decibel-Watts (dBW).

FIG. 11 also represents an example transmit scenario for MWT 206. Depicted in FIG. 11 are representative, requested modem transmit powers $P_{R1}$ and $P_{R2}$ corresponding to modem(1) and modem(2). The example transmit scenario depicted in FIG. 11 corresponds to the scenario in which all of the requested modem transmit powers are below the respective, uniform transmit power limits. In this situation, none of the modems are over-limit, and thus rate-limiting.

Figure 12:
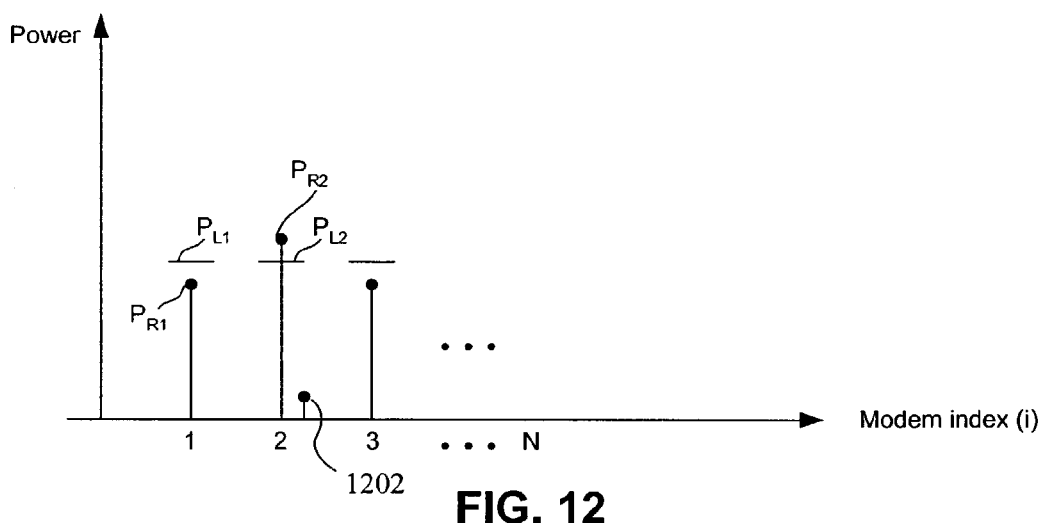
FIG. 12 is another example transmit scenario similar to FIG. 11.

FIG. 12 is another example transmit scenario similar to FIG. 11, except that modem(2) has a requested power $P_{R2}$ exceeding respective transmit power limit $P_{L2}$. Therefore, modem(2) is over-limit, and thus rate-limiting. Since modem(2) is over-limit, controller 214 deactivates modem(2) in accordance with method 700 or method 1000, thereby causing modem(2) to transmit at a zero-data rate, and at a correspondingly reduced transmit power level 1202.

2. Tapered Limits

Figure 13:
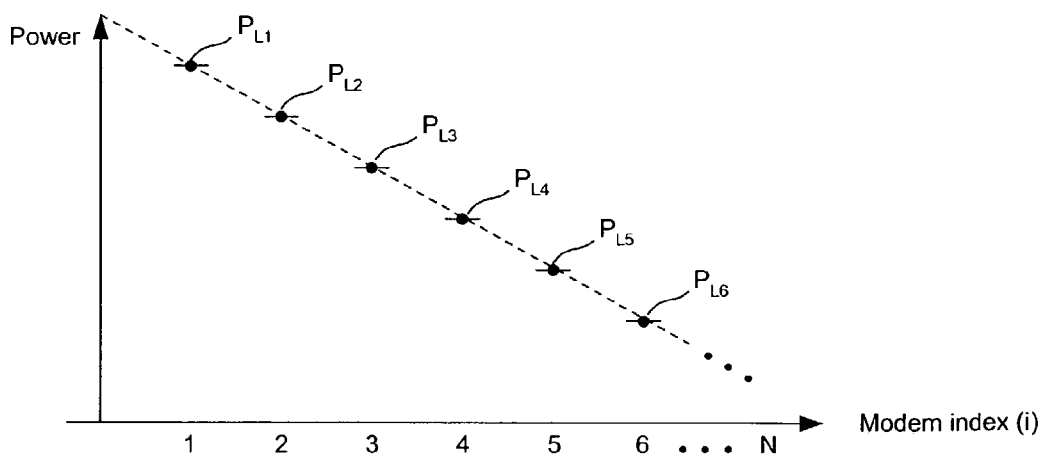
FIG. 13 is an illustration of an alternative, tapered arrangement for the modem transmit power limits.

FIG. 13 is an illustration of an alternative, tapered arrangement for the fixed modem transmit power limits. As depicted, the tapered arrangement includes progressively decreasing transmit power limits $P_{Li}$ in respective successive ones of the N modems, where i=1 . . . N. For example, transmit power limit $P_{L1}$ for modem(1) is less than transmit power limit $P_{L2}$ for modem(2), which is less than transmit power limit $P_{L3}$, and so on down the line.

In one tapered arrangement, each of the transmit power limits $P_{Li}$ is equal to the APL divided by i the total number of modems having transmit power limits greater than or equal to $P_{Li}$. For example, transmit power limit $P_{L5}$ is equal to the APL divided by five (5), which is the number of modems having transmit power limits greater than or equal to $P_{L5}$. In another tapered arrangement, each transmit power limit $P_{Li}$ is equal to the transmit power limit mentioned above (that is, the APL divided by the total number of modems having transmit power limits greater than or equal to $P_{Li}$) less a predetermined amount, such as one, two or even three decibels (dB). This permits a safety margin in the event that the modems tend to transmit at an actual transmit power level that is slightly higher than the respective transmit power limits, before they are deactivated.

Assume a transmit scenario where all of the modems transmit at approximately the same power, and all of the transmit powers are increasing over time. Under the tapered arrangement, modem(N) rate-limits first, modem(N-1) rate limits next, modem(N-2) rate-limits third, and so on. In response, controller 214 deactivates/deschedules modem(N) first, modem(N-1) second, modem(N-3) third, and so on.

VII. MWT Computer Controller

Figure 14:
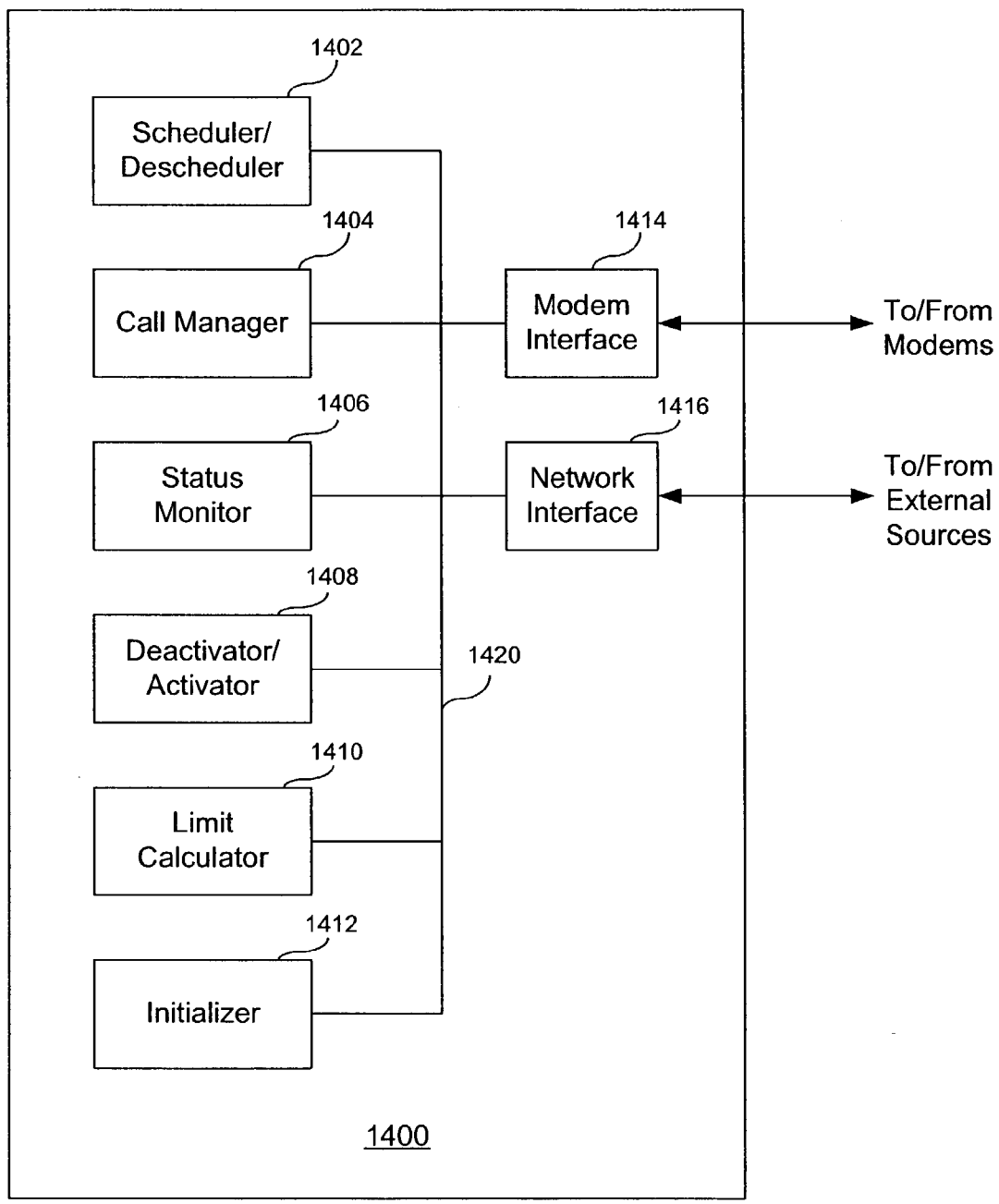
FIG. 14 is a functional block diagram of an example controller of the mobile wireless terminal of FIG. 2, for performing the methods of the present invention.

FIG. 14 is a functional block diagram of an example controller (which can also be a plurality of controllers) 1400 representing controller 214. Controller 1400 includes one or more controller modules for performing the various method steps of the embodiments discussed above. A scheduler/descheduler 1402 schedules active modems to transmit payload data, and deschedules inactive modems. A call manager 1404 establishes data calls and tears-down data calls over the plurality of modems 216, and a status monitor 1406 monitors status reports from modems 216, for example, to determine when various ones of the modems are over-limit, and collects modem transmit data rates and power reports.

A deactivator/activator module 1408 acts to deactivate over-limit ones of the modems (for example by removing the modems from the active list) and to activate deactivated ones of the modems by reinstating the modems on the active list. A limit calculator 1410 operates to calculate/derive transmit power limits for each of the modems 216. Limit calculator can also access predetermined transmit power limits stored in memory 215, for example. An initializer 1412 is used to supervise/manage initialization of the system, such as establishing initial transmit power limits in each modem, setting up calls over each modem, initializing various lists and queues in MWT 206, and so on.

A modem interface 1414 receives data from and transmits data to modems 216; a network interface 1416 receives and transmits data over interface 210; and a software interface 1420 is used for interconnecting all of the above mentioned modules to one another.

Features of the present invention can be performed and/or controlled by processor/controller 214, which in effect comprises a programmable or software controllable element, device, or computer system. Such a computer system includes, for example, one or more processors that are connected to a communication bus. Although telecommunication-specific hardware can be used to implement the present invention, the following description of a general purpose type computer system is provided for completeness.

The computer system can also include a main memory, preferably a random access memory (RAM), and can also include a secondary memory and/or other memory. The secondary memory can include, for example, a hard disk drive and/or a removable storage drive. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

The computer system can also include a communications interface. The communications interface allows software and data to be transferred between the computer system and external devices. Software and data transferred via the communications interface are in the form of signals that can be electronic, electromagnetic, optical or other signals capable of being received by the communications interface. As depicted in FIG. 2, processor 214 is in communications with memory 215 for storing information. Processor 214, together with the other components of MWT 206 discussed in connection with FIG. 2, performs the methods of the present invention.

In this document, the terms "computer program medium" and "computer usable medium" are used to generally refer to media such as a removable storage device, a removable memory chip (such as an EPROM, or PROM) within MWT 206, and signals. Computer program products are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. For example, features of the flow charts depicted in FIGS. 7, 8, 9 and 10, can be implemented in such computer programs. In particular, the computer programs, when executed, enable processor 214 to perform and/or cause the performance of features of the present invention. Accordingly, such computer programs represent controllers of the computer system of MWT 206, and thus, controllers of the MWT.

Where the embodiments are implemented using software, the software can be stored in a computer program product and loaded into the computer system using the removable storage drive, the memory chips or the communications interface. The control logic (software), when executed by processor 214, causes processor 214 to perform certain functions of the invention as described herein.

Features of the invention may also or alternatively be implemented primarily in hardware using, for example, a software-controlled processor or controller programmed to perform the functions described herein, a variety of programmable electronic devices, or computers, a microprocessor, one or more digital signalprocessors (DSP), dedicated function circuit modules, and hardware components such as application specific integrated circuits (ASICs) or programmable gate arrays (PGAs). Implementation of the hardware state machine so as to perform the functions described herein will be apparent to persons skilled in the relevant art(s).

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

VIII. CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or many combinations thereof. Thus, the breadth and scope of the present invention should not be limited by any of the above-described exemplary embodiments, but should be defined only in accordance with the following claims and their equivalents.

The invention claimed is:

1. A method of controlling transmit power in a wireless terminal constrained to operate within a maximum aggregate transmit power limit, the wireless terminal including N wireless modems having their respective transmit outputs combined together to produce an aggregate transmit output, comprising:
   (a) establishing in each of the N modems a respective transmit power limit;
   (b) scheduling active ones of the N modems to transmit respective payload data, thereby causing each active modem to transmit the respective payload data; and
   (c) deactivating at least one over-limit active modem, thereby causing the at least one over limit modem to cease transmitting payload data and correspondingly reduce a transmit power thereof, whereby a power of the aggregate transmit output is correspondingly reduced.

2. The method of claim 1, wherein the at least one over-limit modem is over-limit because either an actual transmit power or a requested transmit power of the modem exceeds the transmit power limit.

3. The method of claim 1, further comprising, deactivating at least one over-limit active modem, monitoring status reports from at least the active modems, one of the status reports indicating the at least one over-limit active modem is over-limit.

4. The method of claim 1, further comprising:
   (d) after deactivating at least one over-limit active modem, activating the modem that was previously deactivated, whereby the previously deactivated modem becomes active again.

5. The method of claim 4, further comprising:
   repeating steps (b), (c) and (d).

6. The method of claim 4, wherein deactivating at least one over-limit active modem comprises initiating an activation timeout period; and further comprising activating the modem that was previously deactivated when the activation timeout period expires.

7. The method of claim 4, wherein step (c) causes the at least one rate-limiting modem to transmit data at a deactivated modem transmit power, the method further comprising, between steps (c) and (d):
   monitoring the deactivated modem transmit power;
   deriving, from the deactivated modem transmit power, an extrapolated transmit power representative of when the modem transmits at a maximum data rate; and
   wherein step (d) further comprises activating the modem that was deactivated in step (c) when the extrapolated transmit power is less than the respective transmit power limit.

8. The method of claim 1, wherein step (c) comprises deactivating all of the active modems, thereby causing all of the active modems to cease transmitting their respective payload data and correspondingly reduce their respective transmit powers.

9. The method of claim 1, further comprising:
   prior to step (a), establishing a separate wireless communication link between each of the plurality of modems and a remote station, each communication link including a forward link and a reverse link; and
   maintaining all of the communication links during steps (a), (b) and (c).

10. The method of claim 9, further comprising the step of receiving at each active modem a respective power control command from the remote station indicating a required transmit power of that modem.

11. The method of claim 1, further comprising:
prior to step (a), establishing a separate wireless communication link between each of the plurality of modems and a remote station, each communication link including a forward link and a reverse link; and
wherein step (c) comprises tearing-down the communication link between the at least one over-limit modem and the remote station.

12. The method of claim 1, wherein step (a) comprises establishing a uniform transmit power limit in each of the N modems.

13. The method of claim 12, wherein the uniform transmit power limit is equal to the aggregate transmit power limit divided by the number of modems, N.

14. The method of claim 1, wherein step (a) comprises establishing progressively decreasing transmit power limits $L_i$ in respective successive ones $M(i)$ of the N modems, where $i=1 \ldots N$.

15. The method of claim 14, wherein each of the transmit power limits $L_i$ is equal to the maximum aggregate transmit power limit divided by the total number of modems having transmit power limits greater than or equal to $L_i$.

16. The method of claim 1, wherein each transmit power limit of step (a) is time-invariant.

17. A wireless terminal constrained to operate within a maximum aggregate transmit power limit, the wireless terminal including N wireless modems having their respective transmit outputs combined together to produce an aggregate transmit output, comprising:
(a) means for establishing in each of the N modems a respective transmit power limit;
(b) means for scheduling active ones of the N modems to transmit respective payload data, thereby causing each active modem to transmit the respective payload data; and
(c) means for deactivating at least one over-limit active modem, thereby causing the at least one over-limit active modem to cease transmitting payload data and correspondingly reduce a transmit power thereof, whereby a power of the aggregate transmit output is correspondingly reduced.

18. The method of claim 17, wherein the at least one over-limit modem is over-limit because either an actual transmit power or a requested transmit power of the modem exceeds the transmit power limit.

19. The wireless terminal of claim 17, further comprising means for monitoring status reports from at least the active modems, one of the status reports indicating the at least one over-limit active modem is over-limit.

20. The wireless terminal of claim 17, further comprising means for activating the modem that was previously deactivated by the deactivating means, whereby the previously deactivated modem becomes active again.

21. The wireless terminal of claim 20, wherein the scheduling means, deactivating means, and activating means perform their respective functions repeatedly.

22. The wireless terminal of claim 20, wherein:
the deactivating means includes means for initiating an activation timeout period; and
the activating means includes means for activating the modem that was previously deactivated when the reactivation timeout period expires.

23. The wireless terminal of claim 20, wherein the at least one rate-limiting modem deactivated by the deactivating means, transmits data at a deactivated modem transmit power, the wireless terminal further comprising:
means for monitoring the deactivated modem transmit power;
means for deriving, from the deactivated modem transmit power, an extrapolated transmit power representative of when the modem transmits at a maximum data rate; and
wherein the activating means includes means for activating the modem that was deactivated when the extrapolated transmit power is less than the respective transmit power limit.

24. The wireless terminal of claim 17, wherein the deactivating means includes means for deactivating all of the active modems, thereby causing all of the active modems to cease transmitting their respective payload data and correspondingly reduce their respective transmit powers.

25. The wireless terminal of claim 17, further comprising:
means for establishing a separate wireless communication link between each of the plurality of modems and a remote station, each communication link including a forward link and a reverse link; and
wherein all of the communication links are maintained while the scheduling means and deactivating means perform their respective functions.

26. The wireless terminal of claim 25, wherein each active modem receives a respective power control command from the remote station indicating the respective required transmit power.

27. The wireless terminal of claim 17, further comprising:
means for establishing a separate wireless communication link between each of the plurality of modems and a remote station, each communication link including a forward link and a reverse link; and
wherein the deactivating means includes means for tearing-down the communication link between the at least one over-limit modem and the remote station.

28. The wireless terminal of claim 17, wherein the transmit power limit established in each of the N modems is the same across all of the N modems.

29. The wireless terminal of claim 28, wherein each transmit power limit is equal to the aggregate transmit power limit divided by the number of modems, N.

30. The wireless terminal of claim 17, wherein the establishing means establishes progressively decreasing transmit power limits $L_i$ in respective successive ones $M(i)$ of the N modems, where $i=1 \ldots N$.

31. The wireless terminal of claim 30, wherein each of the transmit power limits $L_i$ is equal to the maximum aggregate transmit power limit divided by the total number of modems having transmit power limits greater than or equal to $L_i$.

32. The wireless terminal of claim 17, wherein each transmit power limit is time-invariant.

* * * * *